(12) United States Patent
Ferrone et al.

(10) Patent No.: US 7,427,924 B2
(45) Date of Patent: *Sep. 23, 2008

(54) SYSTEM AND METHOD FOR MONITORING DRIVER FATIGUE

(75) Inventors: Christopher W. Ferrone, Glenview, IL (US); Charles Sinkovits, Norridge, IL (US)

(73) Assignee: Triodyne Inc., Northbrook, IL (US)

( * ) Notice: Subject to any disclaimer, the term of this patent is extended or adjusted under 35 U.S.C. 154(b) by 436 days.

This patent is subject to a terminal disclaimer.

(21) Appl. No.: 11/056,655

(22) Filed: Feb. 11, 2005

(65) Prior Publication Data

US 2006/0180379 A1    Aug. 17, 2006

(51) Int. Cl.
*G08B 13/00* (2006.01)
*G08B 23/00* (2006.01)
*G08B 21/00* (2006.01)
*B60K 28/00* (2006.01)
*B60K 28/10* (2006.01)
*G01F 7/00* (2006.01)
*G01M 17/00* (2006.01)
*A01B 69/00* (2006.01)

(52) U.S. Cl. ............ 340/576; 340/573.1; 340/574; 340/575; 340/671; 180/271; 180/272; 180/273; 180/274; 701/29; 701/35; 701/41; 701/213

(58) Field of Classification Search ......... 340/575–576, 340/671, 573.1, 574; 180/272–273, 271, 180/274; 701/29, 35, 41, 213
See application file for complete search history.

(56) References Cited

U.S. PATENT DOCUMENTS

| | | | | |
|---|---|---|---|---|
| 4,017,843 | A * | 4/1977 | Yanagishima | 180/272 |
| 4,234,051 | A * | 11/1980 | Morris, Jr. | 180/272 |
| 4,278,969 | A * | 7/1981 | Woods | 340/576 |
| 4,450,438 | A * | 5/1984 | Seko et al. | 340/576 |
| 4,463,347 | A * | 7/1984 | Seko et al. | 340/576 |
| 4,496,938 | A * | 1/1985 | Seko et al. | 340/576 |
| 4,581,607 | A * | 4/1986 | Seko et al. | 340/576 |
| 4,611,199 | A * | 9/1986 | Seko et al. | 340/576 |
| 4,725,824 | A * | 2/1988 | Yoshioka | 340/575 |
| 6,198,397 | B1 * | 3/2001 | Angert et al. | 340/576 |
| 6,366,207 | B1 * | 4/2002 | Murphy | 340/576 |
| 7,138,923 | B2 * | 11/2006 | Ferrone et al. | 340/576 |

* cited by examiner

*Primary Examiner*—George A Bugg
*Assistant Examiner*—Lam P Pham
(74) *Attorney, Agent, or Firm*—Pauley Petersen & Erickson

(57) ABSTRACT

A method and apparatus for monitoring driver fatigue in a vehicle having a steering control includes connecting a sensor with respect to the steering control and a controller with respect to the sensor. A steering input count signal and/or steering wheel rotation signal is provided from the sensor to the controller and an alarm is activated when the steering input count signal drops below a minimum level and/or the steering wheel rotation signal exceeds a maximum level. The alarm may trigger physical responses within the vehicle including audible, visual, engine management and/or similar responses.

17 Claims, 4 Drawing Sheets

SYSTEM AND METHOD FOR MONITORING DRIVER FATIGUE

FIELD OF THE INVENTION

This invention relates to a driver monitoring device, system and method for determining and responding to fatigue and/or inattention of the driver.

DESCRIPTION OF RELATED ART

The N.T.S.B. has reported statistics which indicate that 31% of all fatal-to-the-truckdriver accidents occur due to fatigue/inattention and 58% of all single-vehicle large truck crashes were also fatigue related. If these numbers can be reduced, so can the number of serious and fatal accidents.

Commercial drivers drive long hours each day and up to 70 hours per week. Such driving occurs throughout all hours of a day: daylight, dusk and night. Fatigue has long been a problem for commercial drivers. Fatigue is cumulative; without proper rest periods, or "off-duty" cycles, fatigue will "accumulate" in the human body and eventually create moments when the driver has to struggle to stay awake. Once this occurs, the overall performance of the driver is greatly compromised.

The Department of Transportation, the National Transportation Safety Board as well as N.H.T.S.A. have collectively invested millions of dollars in researching driver fatigue. Statistics show that over two decades, 30% to 40% of all serious accidents involving heavy trucks are in some way related to fatigue or inattention. Since driver fatigue can only be controlled to an extent, one object of this invention is to detect when the driver is falling asleep or becomes inattentive.

SUMMARY OF THE INVENTION

A driver fatigue and inattention monitoring system as described herein monitors whether a driver is sleeping or inattentive. This integrated system monitors the steering input behavior of the driver during a specified period of time. If the number of steering inputs is below the expected predetermined threshold, the system activates an alarm, such as an audible alarm and/or light in the cab, waking and/or stimulating the driver. Conversely, according to one preferred embodiment of this invention, if the steering input exceeds an expected predetermined threshold, the system activates the alarm. According to one preferred embodiment of this invention, this system can deactivate cruise control and/or activate various other truck systems/components connected with the system to further aid in the control of the truck and to alert nearby motorists.

Research indicates that as drivers begin to become inattentive or fall asleep, the amount of physical steering they do diminishes. This leads to "drifting" or lane changing that would not occur if the driver were awake and/or paying attention. During alert driving, drivers "micro-steer." Micro-steering as used in the specification and claims herein is defined as a series of small steering movements which correct the course of the vehicle. If a driver stops micro-steering, the vehicle drifts or changes lanes. Micro-steering only occurs while the driver is awake. Therefore, there is a direct correlation between micro-steering behavior and driver wakefulness.

Further research concludes that, as a driver begins to fall asleep, they may "jerk" the steering wheel, called "jerk steer," thereby exceeding an expected steering input. Such a sudden motion may be described as a large angular rotation of the steering wheel in a small time increment. According to one preferred embodiment of this invention, this correlation between sudden, large steering inputs and driver wakefulness may further be incorporated into the disclosed system.

A Driver Fatigue Monitoring System as described in the specification and claims is designed to monitor whether a driver is sleeping and/or inattentive. This integrated system monitors the steering input behavior of the driver during a specified period of time. If the number and/or degree of steering inputs is below or above the expected predetermined threshold, the system activates an audible alarm and light in the vehicle cab, waking the driver. In other words, if the driver is not reaching an expected level of micro-steering and/or if the driver exceeds an expected angular threshold with sudden jerk-steering, the system will provide an alert to the driver.

Furthermore, this system can deactivate cruise control and/or activate various other preprogrammed truck systems/components, like brake lights or hazard lights, to further aid in the control of the vehicle and to alert nearby motorists. A proof of concept system was assembled and installed on a 1996 Peterbilt 379 tractor.

One important advantage of the system is that driver sleep and/or fatigue is detected within seconds of onset, thereby awakening the driver. This saves lives, community property and cargo.

The subject invention provides positive results for each of several factors including: practicality, cost, engineering issues, maintainability, market acceptance, prevention of accident(s) and reduction/elimination of injury. This system has been evaluated on all accounts listed. Affirmative results were obtained for each of the factors.

The subject invention is intended to be a practical for both pre- and post-production application to vehicles. Standard off-the-shelf automotive components may be used for motion detection and off-the-shelf electronics (programmable logic controllers) were used. This makes the design cost effective and easy to maintain as no special parts must be developed or fabricated. Low cost and easy maintenance and effectiveness usually lead to market acceptance. As for the safety criteria, waking a sleeping driver will prevent accidents or allow the driver opportunity to mitigate them.

BRIEF DESCRIPTION OF THE DRAWINGS

These and other objects and features of this invention will be better understood from the following descriptions taken in conjunction with the drawings wherein.

DETAILED DESCRIPTION OF THE PREFERRED EMBODIMENTS

FIGS. 1-8 show various embodiments of a driver fatigue and inattention monitoring system according to preferred embodiments of this invention.

Figure 1:
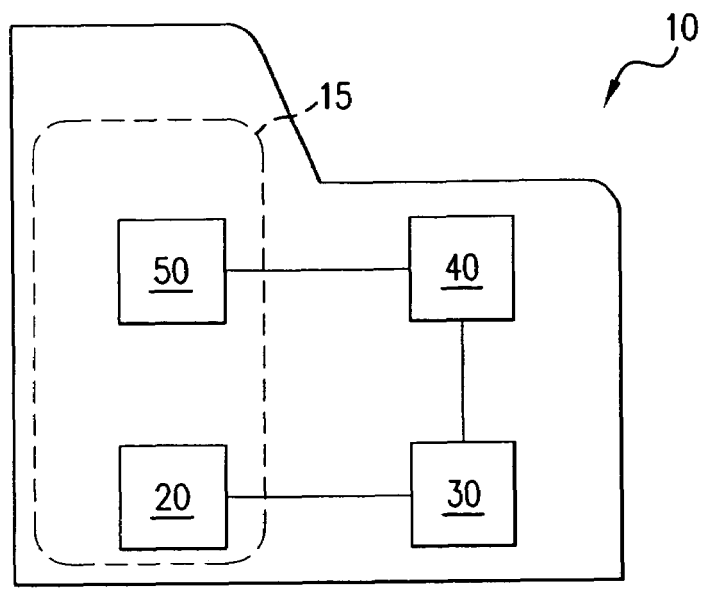
FIG. 1 is a schematic of a system for monitoring driver fatigue according to one preferred embodiment of this invention.

FIG. 1 shows a schematic view of a basic system for monitoring driver fatigue and/or inattention in a vehicle according to one preferred embodiment of this invention. Vehicle 10 as used in the specification and claims herein preferably includes a truck, automobile, van or similar road vehicle but may similarly include a motorcycle, boat, airplane or any other vehicle having a steering control known to those having ordinary skill in the art. Steering control 20 as used in the specification and claims herein preferably includes a steering wheel but may also include a joystick, helmswheel or similar controls known to those having ordinary skill in the art.

As shown schematically in FIG. 1, sensor 30 is connected with respect to steering control 20. Sensor 30 may electronically connected, mechanically connected, such as described in more detail below, or otherwise connected with respect to steering control 20 so as to measure steering inputs to steering control 20.

Steering input may be measured by calculating a steering input activity level measured over a time duration. The steering input activity level may be measured as a number of steering inputs, a degree rotation of a single steering input, or both.

For instance, in a preferred embodiment of this invention that alerts against micro-steering, steering input activity level may be measured to determine whether the number and/or degree of steering inputs is below the expected predetermined threshold. The invention may further or alternatively alert against jerk-steering and measure steering input activity to determine whether the number and/or degree of steering inputs is above the expected predetermined threshold. Thus, if the driver is not reaching an expected level of micro-steering and/or if the driver exceeds an expected angular threshold with sudden jerk-steering, the system will provide an alert to the driver.

Controller 40 is preferably connected with respect to sensor 30. Sensor 30 preferably provides a steering input count signal to controller 40 for processing as described in more detail below. Controller 40 preferably processes and identifies a condition that requires activation of alarm 50 connected with respect to controller 40. Alarm 50 is preferably positioned and/or activatable within operator and/or driver compartment 15 of vehicle 10. Alarm 50 is preferably activated when the steering input count signal drops below a minimum level and/or when the steering input rotation exceeds a maximum level.

Alarm 50 may comprise an audible alarm, such as a buzzer, horn, siren or similar such audible alarm. Additionally, or in the alternative, alarm 50 may comprise a light, such as a warning light, a strobe, a rotating light or similar visual cue. According to a preferred embodiment of this invention, whenever alarm 50 is activated, the driver or operator should manually reset alarm 50 to resume normal operation of vehicle 10.

Figure 2:
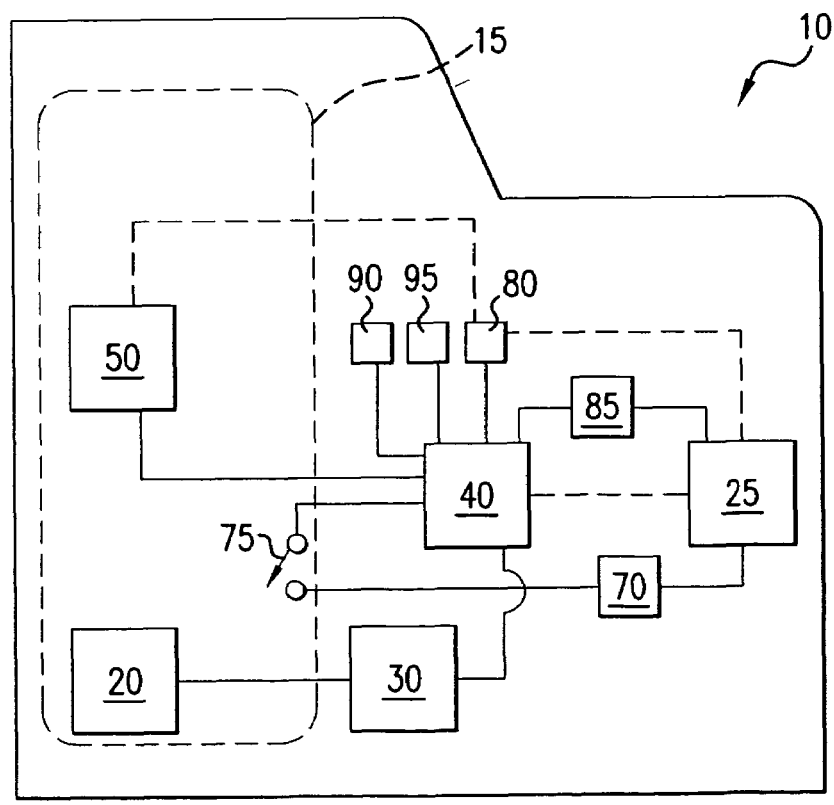
FIG. 2 is a schematic of a system for monitoring driver fatigue according to one preferred embodiment of this invention.

According to one preferred embodiment of this invention shown schematically in FIG. 2, the system further includes speed control device 70 connected with respect to vehicle 10 and to controller 40. Speed control device 70 may include cruise control or similar device that maintains the speed of vehicle 10 without driver or operator input. Preferably, when the steering input count signal drops below a minimum level or exceeds a maximum threshold and alarm 50 is activated, controller 40 further disables speed control device 70 thus slowing down or coasting vehicle 10 and further alerting driver regarding inattention and/or fatigue. Controller 40 may additionally activate brake lights and/or activate 4-way hazard flashers.

According to one variation of this embodiment, switch 75 is connected to speed control device 70 and alarm 50 wherein switch 75 is operable to reset alarm 50. As a result, if a driver trips alarm 50 resulting in interruption of speed control device 70, a manual operation such as resetting switch 75 is required to resume operation of speed control device 70, such as cruise control. In addition or alternatively, an engine brake may be activated following activation of alarm 50.

According to one preferred embodiment of this invention, also shown schematically in FIG. 2, the system further includes counter 80 integrated with or connected with respect to controller 40. In such an arrangement, counter 80 would track the number of alarm activations until reaching a predetermined number of alarm activations, following which, controller 40 would disable the speed control device 70 and/or otherwise disable vehicle 10, for example by tripping a kill switch or immobilizer in engine 25 and/or engine management software.

Controller 40 may further include limiter 85 connected with respect to alarm 50 so that, following a predetermined number of alarm activations, limiter 85 reduces the performance of vehicle 10, such as by shutting down cylinders in engine 25, adjusting parameters within the engine management software, and/or other operation which results in a reduction of performance, particularly speed and acceleration capabilities, of vehicle 10. In addition, limiter 85 may work with engine management software to sequentially reduce vehicle 10 power and/or performance as alarm 50 is activated, with or without use of counter 80. For example, following activation of alarm 50 a first time, engine performance may be reduced by 25% following which a second activation of alarm 50 may reduce engine performance by 50% and so on until, theoretically, vehicle 10 may be completely immobilized upon X number of alarm activations, wherein X may be set by the owner/custodian or operator/driver of vehicle 10.

According to one particular arrangement of the invention, best shown in FIGS. 3-5, 7 and 8, sensor 30 comprises tone ring 35 mounted with respect to steering control 20, specifically to steering shaft 22. Tone ring 35 is thereupon connected with sensor 30 to provide the steering input count and/or rotation signal.

Sensor 30 may comprise any number of sensors known to those having ordinary skill in the art, however, specifically, sensor 30 may comprise an ABS sensor or an industrial proximity sensor which are positioned relative to steering control 20 such as steering shaft 22 in vehicle 10 having traditional steering control or to an electronic control for certain contemporary drive-by-wire steering systems.

Controller 40 may comprise a programmable logic controller connected with sensor 30. The programmable logic controller preferably uses ladder logic to evaluate steering input to interpret a pulse signal generated by sensor 30.

According to an additional embodiment of the subject invention, recording device 90 is connected with respect to alarm 50. Recording device 90 preferably logs one or more parameters upon activation of alarm 50. Such parameters may include a time, a date and/or a speed at activation of alarm 50. Such logged data may then be analyzed by the owner/custodian of vehicle 10 or applicable authorities to determine the specific conditions that led to activation of alarm 50. In addition, global positioning system 95 may be connected with respect to recording device, the recording device logging at least one of a longitude, latitude and speed at activation of the alarm.

According to a preferred embodiment of this invention, the system has a self-check function which initiates at vehicle start-up. If system faults are detected at startup or during driving, a "check steering" light illuminates notifying the driver that the system has malfunctioned.

In addition to the failure signal light, the system reverts to "typical" speed control functions in the event of a monitoring system failure. This "fail to safety" philosophy is preferably applied to all other pre-programmed vehicle system options. That is, all other pre-programmed vehicle system options preferably go back to their normal way of operating as if the new monitoring system was not in place.

One important advantage of the system is that driver sleep and/or fatigue is detected within seconds of onset, thereby awakening the driver. This saves lives, community property and cargo.

Accordingly, a method of monitoring driver fatigue and inattention in vehicle 10 having steering control 20 includes connecting sensor 30 with respect to steering control 20 and controller 40 with respect to sensor 30. In addition, alarm 50 is connected with respect to controller 40. A steering input count signal and/or a steering wheel rotation signal is provided from sensor 30 to controller 40 and alarm 50 is activated when the steering input count signal drops below a minimum level or the steering wheel rotation signal exceeds a maximum level.

The steering input count signal may provide information that the driver's input count signal has dropped below a minimum level of expected micro-steer. The steering input count signal and/or the steering wheel rotation signal may further provide information that the driver's input count signal is exceeding a steering angle or rotation in a large time increment or a short time increment thus suggesting jerk-steer. Each of these conditions preferably results in activation of alarm 50. In addition, alarm 50 may be activated if there occurs a change from micro-steering to large amplitude steering thereby suggesting sleep, inattention and/or impairment.

As described in more detail above, one or more additional operations may be tied into alarm 50 including speed control device 70, engine brake, brake lights, flashers, counter 80, limiter 85 and/or any other vehicle operation that will assist in the continued safe operation and/or non-operation and/or reduced operation of vehicle 10. Several particular applications and methods of use of the subject invention are described in the following examples.

EXAMPLE 1

Cruise Control Deactivation

As described above, the driver fatigue monitoring system may comprise the following components: ABS tone-ring 35, ABS sensor, wiring and a controller 40 consisting of a networked I/O module. The networked I/O module may feature universal input-output ranges and a micro-controller to provide monitoring and control capabilities. This networked I/O module monitors discreet levels of various devices and/or provides on/off control capabilities. The networked I/O module function capability preferably includes control of: on/off; high/low; open/close switching; along with activation of audible and visual alarms.

Figure 3:
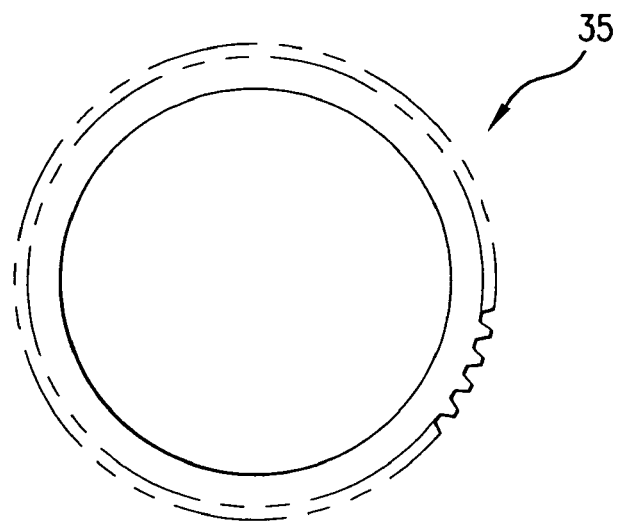
FIG. 3 is a front view of a tone ring according to one preferred embodiment of this invention.
Figure 4:
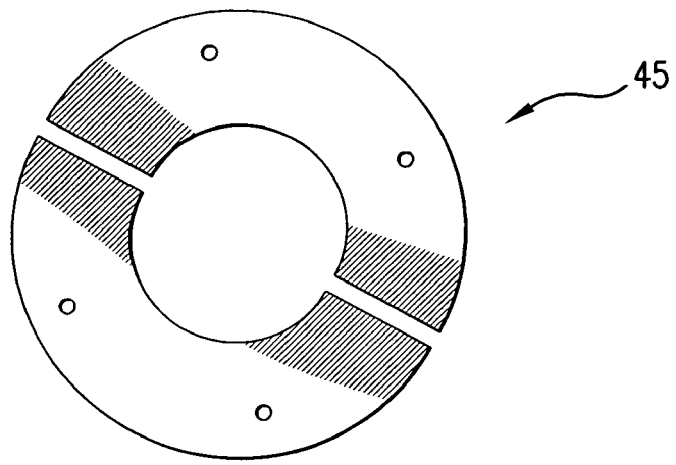
FIG. 4 is a front view of a self-centering clamp according to one preferred embodiment of this invention.
Figure 5:
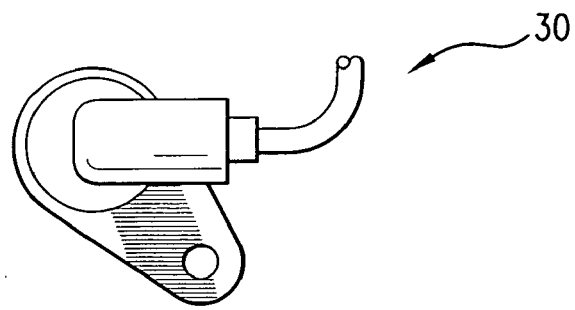
FIG. 5 is a front view of a sensor according to one preferred embodiment of this invention.
Figure 6:
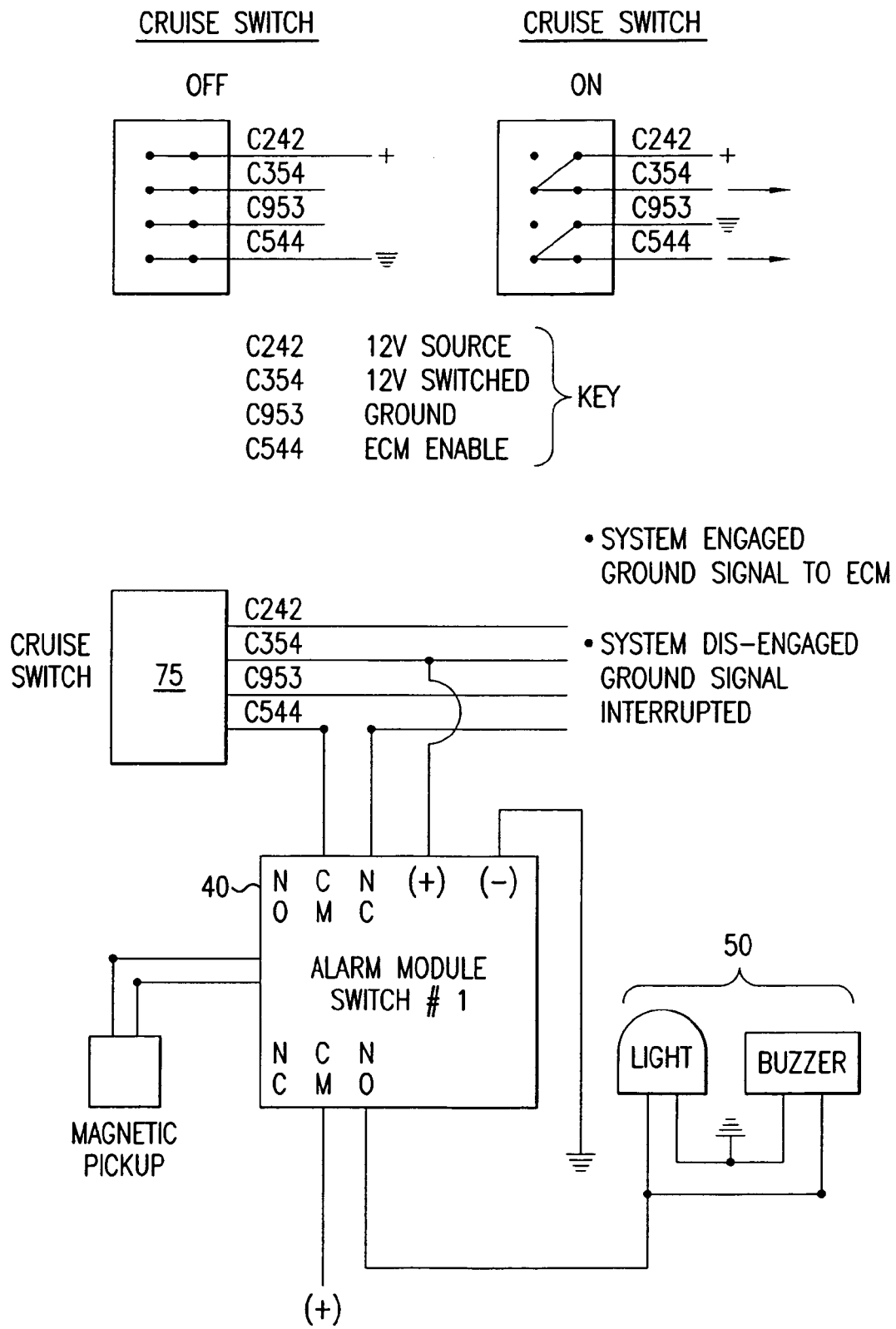
FIG. 6 is a wiring schematic of the system according to one preferred embodiment of this invention.
Figure 7:
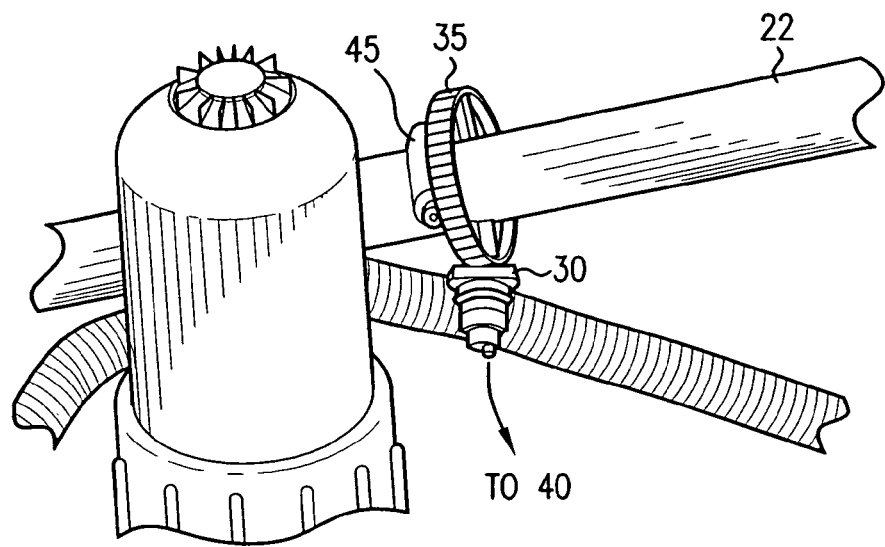
FIG. 7 is a side view of the sensor and tone ring according to one preferred embodiment of this invention.

Tone-ring 35, such as shown in FIG. 3, maybe mounted on steering shaft 22 within an engine compartment of the vehicle or a cab shaft within passenger compartment 15 of the vehicle by way of a self-centering clamp 45, such as shown in FIG. 4. The self-centering clamp 45 permits tone-ring 35 to mount to steering shaft 22 concentrically. Sensor 30, such as shown in FIG. 5, is then mounted with respect to tone ring 35. As shown in FIG. 7, sensor 30 is preferably mounted to a left frame rail of vehicle 10 with a bracket that allows for positioning and adjustment. Sensor 30 is then preferably wired into the cab to the networked I/O module (or controller 40). The networked I/O module utilizes a millivolt AC signal from sensor 30 to determine steering input activity. The networked I/O module is preferably programmed for the particular application, vehicle, response, desired alarms, etc. via software supplied with it through a suitable interface, such as a laptop computer. Steering input counts, angularity/rotation and time duration may be adjustable through the interface. The steering input counts and angularity/rotation may be converted to millivolts which may then be analyzed by the networked I/O module.

According to one preferred embodiment of this invention, as long as the networked I/O module detects a signal greater than a predetermined parameter, such as approximately 40 millivolts in approximately 5.4 seconds, no action is taken by the networked I/O module. If the signal drops below the predetermined parameter, for example, 40 millivolts in 5.4 seconds, a predetermined set of contacts close in the networked I/O module. Once these contacts close, the system preferably begins to activate. A desired configuration of alarm 50 preferably: (1) disables the cruise control (normally closed contacts), and (2) activates alarm 50 within driver compartment 15 such as an audible alarm and light (normally open contacts), such as shown in the wiring diagram in FIG. 6. Once this occurs, the system will remain "on" disallowing future cruise mode and continuing the audible alarm and light. This activity is preferably deactivated only by cycling the cruise on/off switch 75. Once the cruise on/off switch 75 is cycled, the system can be reactivated.

EXAMPLE 2

Cruise Control Deactivated

Figure 8:
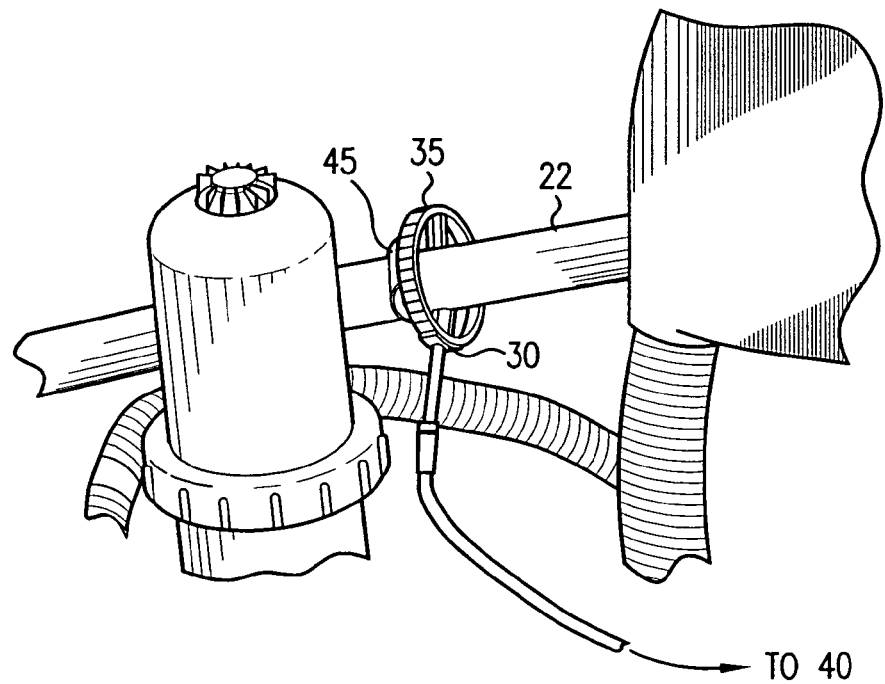
FIG. 8 is a side view of the sensor and tone ring according to one preferred embodiment of this invention.

This system may be comprised of components as described above, or alternatively, by non-automotive components with the exception of tone ring 35. An industrial proximity sensor may be used in place of the ABS sensor. The industrial proximity sensor has the ability to actually detect a discreet number of tooth counts from the tone ring, such as shown in FIG. 8.

The tone ring 35 and proximity sensor preferably operate in a similar manner as the components described in Example 1. However, the signal generated from the proximity sensor is preferably fed into a programmable logic controller (PLC). The PLC preferably uses ladder logic to evaluate the steering input and the subsequent output actions. The PLC is programmed originally through an interface, such as a laptop computer, but can be reprogrammed through a touch pad on its face. As long as the PLC detects a signal (such as 3 pulses in 6 seconds), no action is taken.

If the signal drops below 3 pulses in 6 seconds, the output logic begins to function and deactivates the cruise control and activates alarm 50, such as an audible alarm and light within driver compartment 15. Once this activation has occurred, the system will remain "on" disallowing future cruise mode and continuing the alarm and light. Preferably, this activation may only be deactivated by cycling switch 75, such as the cruise control on/off switch. Once the on/off switch is cycled, the system can be reactivated.

Alternatively, if the signal exceeds a defined steering angle or rotation in a minimum time period, the output logic may likewise function and deactivate cruise control and activate alarm 50. When such defined steering angles and/or rotations are exceeded, the system according to this invention preferably deactivates cruise control thereby eliminating the need for the driver to step on the brake pedal for manual deactivation.

The cruise control is preferably deactivated the same way for both Examples 1 and 2. Specifically, the networked I/O module of Example 1 or the PLC of Example 2 eliminate the electrical ground source at the cruise on/off dash switch location. Once the switch ground has been interrupted, the cruise control drops out and no longer will function until the system re-initiates.

The driver fatigue/inattention monitoring system and method as described has numerous applications including automobiles, SUVs, buses and a variety of trucks. A principle function of the system is to detect sleeping or inattentive drivers. Expanding the system to control other vehicle system controls can be customized based on the vehicle, driver, community and vehicle operational profile.

As described above, the system may include recording device 90 to record an "event" if sleep is detected, that can be logged on the PLC for later extraction and analysis. The event data may include time, date, speed(s), etc. If the vehicle utilizes satellite navigation, an "event" can be time stamped with: longitude, latitude, speed and can automatically send an emergency message. In addition, a cruise control termination strategy could be developed which would eventually preclude the use of cruise control after repeated activations of the sleep detection system. Only after a prescribed "lockout" time has been met would the cruise be reactivated. Along with this to force the driver to stop driving and rest, an engine de-rating schedule similar to engine protection logic may be utilized. This would begin to reduce engine performance sequentially (i.e., 75%, 50%, 25% power) after multiple triggers, if the driver refused to stop driving and rest.

Additional hardware and/or software may be included which eliminate the possibility of false steering inputs caused by road vibrations. For example, a triaxial accelerometer may be incorporated to record road vibrations and then have them subtracted out of the count. Alternatively, or in addition, tone-ring 35 and/or sensor 30 may be mounted to a portion of steering shaft 22 within driver compartment 15.

According to one preferred embodiment of this invention, the system may be adjustable for time duration, steering input counts and/or steering angles/rotation. Depending upon the vehicle, industry, environment, etc., adjustments may be made to parameters such as time duration and steering input counts based upon parameters that are important to the application. For example, steering inputs counts may be increased for use on winding mountain roads versus use on long stretches of interstate highways. In addition, adjustments may be made in steering angles/rotation depending on the "lock-to-lock" steering response ratio of the particular vehicle. Protections may be incorporated so that only authorized maintenance personnel with personal identification numbers (PINS) can make such adjustments. Time stamping the adjustment along with other critical chronology data will assist with accountability.

According to one preferred embodiment of this invention, the system may use adaptive learning similar to fuel trim control or shift scheduling in some automatic transmissions. This approach will allow for specific driving habits to be recognized and learned by the system. Once accomplished, the system may adjust for a driver's normal or expected behavior and can more accurately distinguish sleeping, inattentiveness and/or fatigue. Such adaptive learning may allow the system to: identify driver behavior patterns and variations therefrom; detect and compare unusual driving patterns with expected driving patterns; learn road conditions; adjust for steering system wear; and/or recognize a maintenance failure such as loose or worn suspension linkages, bearings, tires, steering boxes and/or similar components.

The system may further accommodate for "bump steer" due to jouncing; "road steer" due to roadway crown and other grooves/bumps; and other environmental factors. Additional steering input sensors may be incorporated into vehicle 10 to detect if the road or the driver has initiated the most recent steering motion.

Additionally, mechanisms to recognize steering box wear, with respect to age and mileage, that create more active steering by the driver to maintain guidance of the vehicle may be incorporated. Such customization may further include determination of a steering "center" to account for vehicle turning as with a gradual lane change or perhaps misalignment.

According to one preferred embodiment of this invention, the system may remain in an off or "sleep" mode until the vehicle reaches a predetermined speed such as 45 mph. In addition, the system of this invention may be used in connection with other methods of sleep/inattention/impairment detection such as driver EEG, EKG, eyelid blink, facial droop/changes, pupil reactions, etc.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A system for monitoring driver fatigue and inattention in a vehicle having a steering control, the system comprising:
   a sensor connected with respect to the steering control and the sensor having a millivolt AC signal;
   a controller connected with respect to the sensor, the sensor providing a steering input activity level to the controller, the controller includes a limiter connected with respect to an alarm, the limiter reducing the performance of the vehicle following a predetermined number of alarm activations, wherein the predetermined number of alarm activations is greater than one, the limiter reduces a performance of a vehicle by at least one of shutting down cylinders in an engine and adjusting parameters within an engine control management software;
   the alarm connected with respect to the controller, the alarm activated when the steering input activity level exceeds a predetermined threshold, wherein the predetermined threshold comprises a steering input rotation that exceeds a maximum level; and
   a speed control device connected with respect to the vehicle and to the controller, wherein the controller disables the speed control device upon activation of the alarm.

2. The system of claim 1 wherein the predetermined threshold also comprises a steering input count signal below a minimum level.

3. The system of claim 1 wherein the alarm comprises at least one of an audible alarm and a light.

4. The system of claim 1 further comprising:
   a switch connected to the speed control device and the alarm, the switch operable to reset the alarm.

5. The system of claim 1 further comprising:
a counter connected with respect to the controller, the controller disabling the speed control device upon the counter obtaining a predetermined number of alarm activations, wherein the predetermined number of alarm activations is greater than one.

6. The system of claim 1 further comprising:
a tone ring mounted with respect to the steering control, the tone ring connected with the sensor to provide the steering input activity level.

7. The system of claim 1 wherein the steering input activity level is measured over a time duration.

8. The system of claim 1 wherein the sensor comprises an industrial proximity switch.

9. The system of claim 1 wherein the controller comprises a programmable logic controller.

10. A method of monitoring driver fatigue in a vehicle having a steering control, the method comprising:
connecting a sensor having a millivolt AC signal with respect to the steering control;
connecting a controller with respect to the sensor, wherein the controller includes a limiter connected with respect to an alarm, the limiter reducing the performance of the vehicle following a predetermined number of alarm activations, wherein the predetermined number of alarm activations is greater than one, the limiter reduces a performance of a vehicle by at least one of shutting down cylinders in an engine and adjusting parameters within an engine control management software;
providing a steering input signal from the sensor to the controller;
connecting an alarm with respect to the controller; and
activating the alarm and reducing the performance of the vehicle when the steering input signal drops below a minimum count level or exceeds a maximum rotation level.

11. The method of claim 10 further comprising the step of:
deactivating a speed control device following activation of the alarm.

12. The method of claim 10 further comprising the step of:
activating an engine brake following activation of the alarm.

13. The method of claim 10 further comprising the step of:
activating at least one of an audible alarm and a light following activation of the alarm.

14. A method of monitoring driver fatigue in a vehicle having a steering wheel and cruise control, the method comprising:
connecting a sensor having a millivolt AC signal with respect to the steering wheel;
connecting a controller with respect to the sensor, wherein the controller includes a limiter connected with respect to an alarm, the limiter reducing the performance of the vehicle following a predetermined number of alarm activations, wherein the predetermined number of alarm activations is greater than one, the limiter reduces a performance of a vehicle by at least one of shutting down cylinders in an engine and adjusting parameters within an engine control management software;
providing a steering input count signal and a steering wheel rotation signal from the sensor to the controller;
connecting an alarm with respect to the controller;
activating the alarm and reducing the performance of the vehicle when the steering input count signal drops below a minimum level or the steering wheel rotation signal exceeds a maximum level;
deactivating the cruise control; and
manually resetting the cruise control and the alarm.

15. The method of claim 14 further comprising the step of:
sequentially reducing vehicle power as the alarm is activated.

16. The method of claim 14 further comprising:
activating the sensor when the vehicle reaches a predetermined speed.

17. The method of claim 14 wherein the system uses adaptive learning for at least one of:
identifying a driver behavior pattern and a variation therefrom;
detecting and comparing an unusual driving pattern with an expected driving pattern;
learning a road condition;
adjusting for a steering system wear; and
recognizing a maintenance failure.

* * * * *